United States Patent
Guo et al.

(10) Patent No.: US 7,243,235 B2
(45) Date of Patent: Jul. 10, 2007

(54) MANDATORY ACCESS CONTROL (MAC) METHOD

(75) Inventors: Jinhong Katherine Guo, West Windsor, NJ (US); Stephen L. Johnson, Erdenheim, PA (US); Il-Pyung Park, Princeton Junction, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 386 days.

(21) Appl. No.: 10/863,784

(22) Filed: Jun. 8, 2004

(65) Prior Publication Data

US 2005/0273619 A1 Dec. 8, 2005

(51) Int. Cl.
H04L 9/00 (2006.01)
G06F 7/04 (2006.01)
G06F 17/30 (2006.01)
H04L 9/32 (2006.01)
H04L 12/22 (2006.01)
G06F 11/00 (2006.01)
G06F 13/00 (2006.01)

(52) U.S. Cl. .................. 713/176; 713/182; 726/26; 726/27; 726/33; 707/9

(58) Field of Classification Search ........... 713/187, 713/182; 726/26, 27, 33; 707/9
See application file for complete search history.

(56) References Cited

U.S. PATENT DOCUMENTS

| 5,937,159 | A | 8/1999 | Meyers et al. |
| 6,023,765 | A | 2/2000 | Kuhn |
| 6,044,466 | A | 3/2000 | Anand et al. |
| 6,289,462 | B1 | 9/2001 | McNabb et al. |
| 6,304,973 | B1 | 10/2001 | Williams |
| 6,430,561 | B1 * | 8/2002 | Austel et al. .......... 726/26 |

OTHER PUBLICATIONS

Biba, "Integrity Considerations for Secure Computer Systems", MITRE Technical Report MTR-3153, MITRE Corporation, 1975, 69 pages.
Fraser, "LOMAC: Low Water-Mark Integrity Protection for COTS Environments", Proceedings of the 2000 IEEE Symposium on Security and Privacy, 2000, 16 pages.
Dieter Gollmann, "Computer Security", Wiley, 1999, 2 pages.
E. Amoroso, "Fundamentals of Computer Security Technology", Prentice Hall, 1994, 11 pages.

* cited by examiner

*Primary Examiner*—Kambiz Zand
*Assistant Examiner*—Courtney D. Fields
(74) *Attorney, Agent, or Firm*—Harness, Dickey & Pierce, PLC

(57) ABSTRACT

A mandatory access control method for securing an operating system is presented. A first integrity subject reads a first object. The first integrity subject attempts to read a second object. It is determined that a conflict exists between the first and second objects. At least one security rule is applied to the conflict between the first and the second objects.

13 Claims, 10 Drawing Sheets

MANDATORY ACCESS CONTROL (MAC) METHOD

FIELD OF THE INVENTION

The present invention relates to a security system for an operating system. More particularly, the invention relates to a security system technique that uses previous behavior of a subject to control access to an object.

BACKGROUND OF THE INVENTION

One of the most significant issues related to operating systems for a computer system involves security. Security systems are designed to protect the confidentiality, the integrity, and the availability of an operating system. One aspect of a security system involves reducing opportunities for malicious computer instructions (e.g. a virus, a Trojan horse etc.) to affect the operating system. Operating systems such as UNIX or operating systems derived from UNIX (e.g. LINUX) incorporate a security system that can be vulnerable to malicious computer instructions.

There are several types of mechanisms that are presently used to secure operating systems such as a discretionary access control (DAC) or a mandatory access control (MAC). The DAC is unable to completely secure these operating systems for a variety of reasons. For example, the DAC restricts access to objects based solely on the identity of a subject. This makes the operating system vulnerable to Trojan horses.

Other operating systems use a MAC. A Biba low watermark mandatory access control mechanism (LOMAC) protects the operating system by dividing processes into different security areas such as HIGH and LOW integrity data. HIGH integrity data relates to highly sensitive data whereas the LOW integrity data relates to low sensitive data.

The LOMAC security rules require that a write-up not occur between objects and subjects. To illustrate, a LOW integrity subject cannot write to a HIGH integrity object. Additionally, if a HIGH integrity subject attempts to read a LOW integrity object, the HIGH integrity subject is automatically demoted to the same level as the LOW integrity object that it attempted to read. Accordingly, in this instance, the HIGH integrity subject is demoted to a LOW integrity subject.

In order to practically implement the LOMAC, the LOMAC requires that exceptions to the security rules be granted in order to overcome an access control mechanism that is too coarse grained. For example, certain computer programs are granted a trusted status with special hard-coded privileges. Trusted status means that the operating system automatically recognizes computer instructions without checking for security issues. Syslogd in Linux exemplifies the trusted status that is granted to a Linux system logging utility by the LOMAC. Syslogd is implemented as a trusted process because syslogd needs to access user profiles and also write to the system LOG files. In addition to granting trusted status to computer programs, the LOMAC performs poorly with respect to confining computer programs to their least required privileges. It is therefore desirable to have a system or a method that overcomes the disadvantages associated with conventional security systems.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
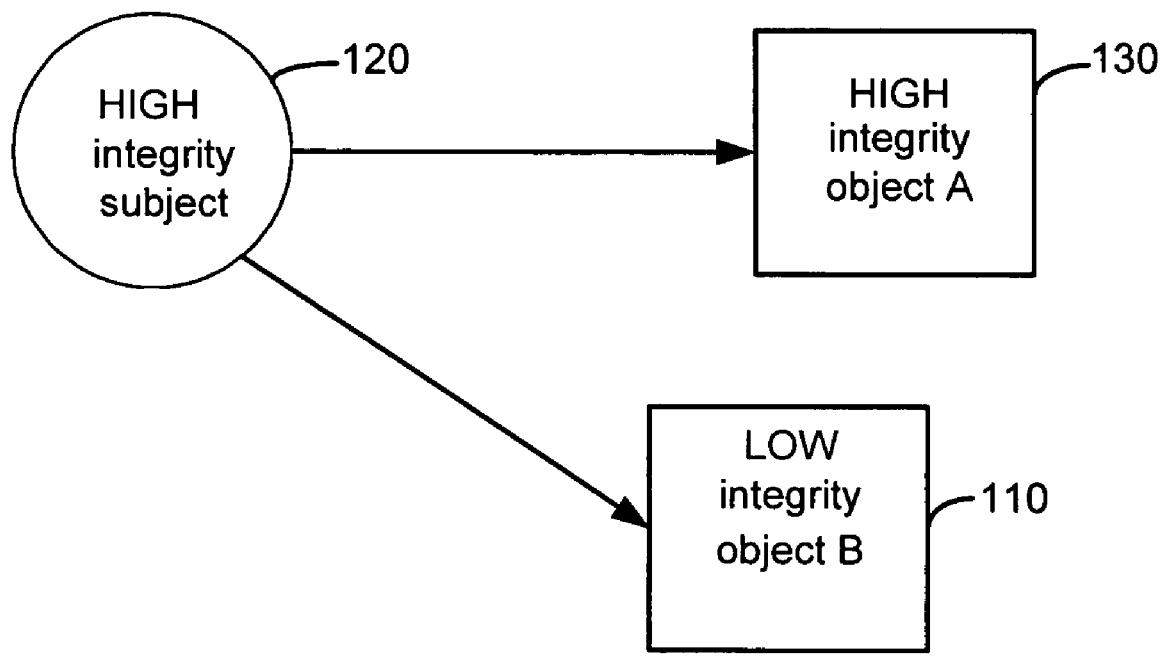
FIG. 1 is a block diagram of a HIGH integrity subject that reads a HIGH integrity object and then reads a LOW integrity object in accordance with one embodiment of the invention.

The following description of the preferred embodiments is merely exemplary in nature and is in no way intended to limit the invention, its application, or uses. Techniques of the invention improve the security of an operating system by incorporating a mandatory access control (MAC) that uses the prior behavior of a subject. In particular, the MAC considers the action of a subject that reads one object and then attempts to read another object that has a conflict of interest with the first object. A conflict of interest occurs when it is possible that data of one object may be used to corrupt the data of another object. In one embodiment, a conflict of interest between two objects that have been read by a subject requires that the subject be demoted whereas a nonconflict of interest between objects does not result in the demotion of the subject. In another embodiment, a conflict of interest between objects causes the subject to be denied access to the second object.

To better understand these concepts, the definition of a subject, an object, and integrity levels are now presented. A subject (also referred to as a process) is a set of instructions that perform an action such as a read operation on the object, a write back operation to the object, or other suitable operation. An object, on the other hand, is a resource. Examples of objects include a file or a file directory. Each object includes an attribute or a plurality of attributes. An attribute is a quality or characteristic that is associated with or inherent to the object. At least one or more of the attributes are security attributes.

The integrity of a subject relates to the sensitivity or trust level associated with the subject. A higher integrity subject corresponds to items of higher sensitivity or levels of trust. In one embodiment, a higher integrity subject is represented by the term HIGH integrity subject and a lower integrity subject is represented by the term LOW integrity subject. A similar analysis applies to objects.

In another embodiment, there are multiple levels of subjects at multiple integrity levels. For example, a subject may include a first integrity level, a second integrity level, a third integrity level . . . or an N integrity level. In one embodiment, the highest level may be associated with the highest level of sensitive or confidential material that is stored. Given these definitions, general examples are presented below that relate to HIGH and LOW integrity subjects and objects followed by a more detailed description relative to FIGS. 1-6.

One example involves a HIGH integrity subject that reads for a first time a HIGH integrity object. The HIGH integrity subject then attempts to read a LOW integrity object that has a conflict of interest with the first HIGH integrity object. In this embodiment, the HIGH integrity subject is then demoted to a LOW integrity subject based upon the conflict of interest.

In another embodiment, a HIGH integrity subject reads for a first time a first HIGH integrity object. The HIGH integrity subject then attempts to read a second HIGH integrity object that has a conflict of interest with the first HIGH integrity object. In this embodiment, the HIGH integrity subject is denied access to the second HIGH integrity object.

In still yet another embodiment, a LOW integrity subject first reads a LOW integrity object. The LOW integrity subject then attempts to read a HIGH integrity object that has a conflict of interest with the LOW integrity object. Based upon the conflict of interest between the objects, the LOW integrity subject is denied access to the HIGH integrity object.

In another embodiment, a LOW integrity subject first reads a first LOW integrity object. The LOW integrity subject then attempts to read a second LOW integrity object that has a conflict of interest with the first LOW integrity object. The LOW integrity subject is denied access to the second LOW integrity object. While these examples are presented in terms of HIGH and LOW subjects and objects, skilled artisans understand that other security rules may be designed to apply to multiple integrity levels for both the subject and the objects. Implementation of this fine grained integrity security system eliminates granting of exceptions to certain security rules (e.g. trusted status to computer programs).

Several embodiments are now described in detail with respect to the figures. FIG. 1 illustrates a block diagram of the interrelationship between two objects, and a HIGH integrity subject 120. A HIGH integrity subject 120 is configured to read from a LOW integrity object 110 or a HIGH integrity object 130. In this embodiment, the HIGH integrity subject 120 will not be demoted or penalized since it is the first time that the HIGH integrity subject 120 accesses one of the objects such as the HIGH integrity object 130 or the LOW integrity object 110.

Figure 2A:
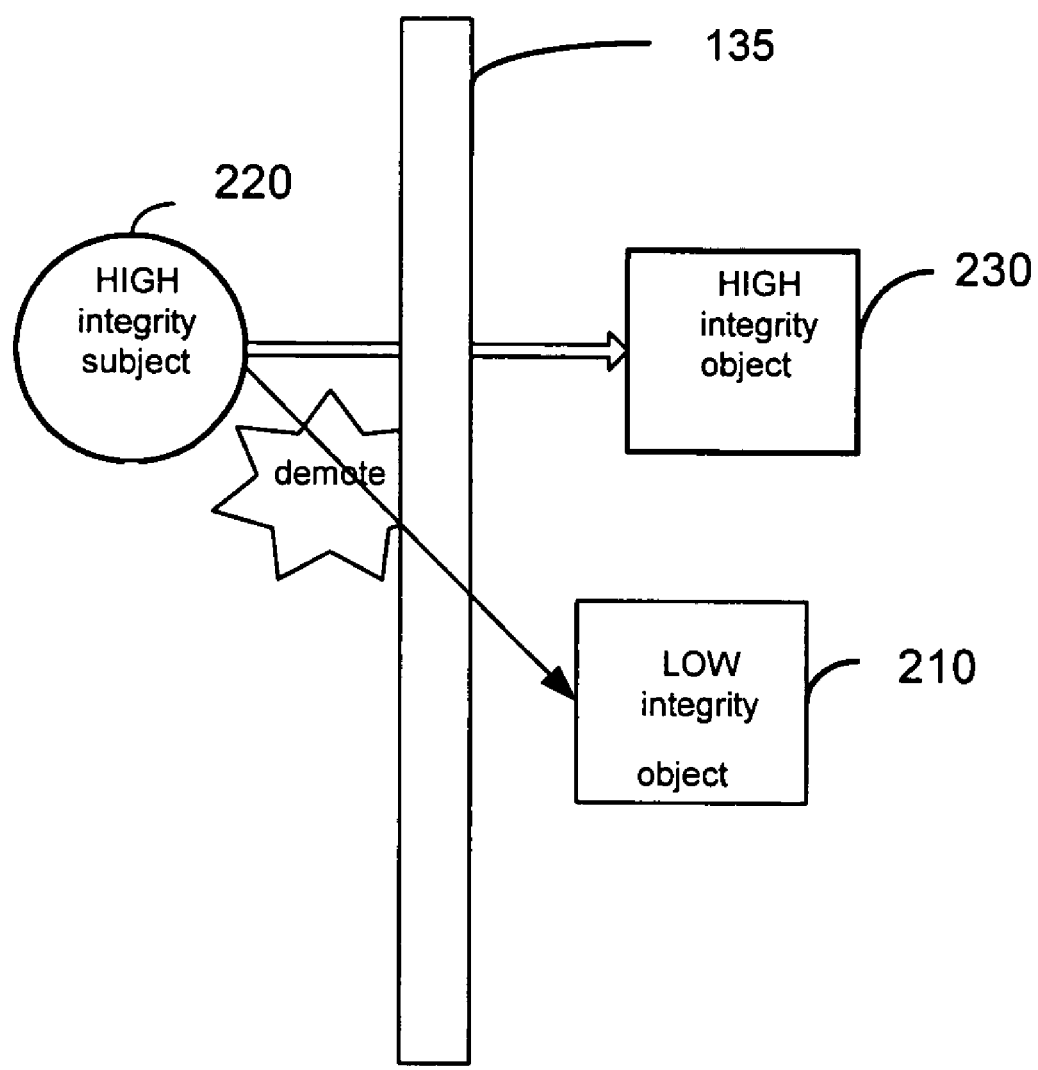
FIG. 2A is a block diagram that illustrates the demotion of a HIGH integrity subject to a LOW integrity subject in accordance with one embodiment of the invention.
Figure 2B:
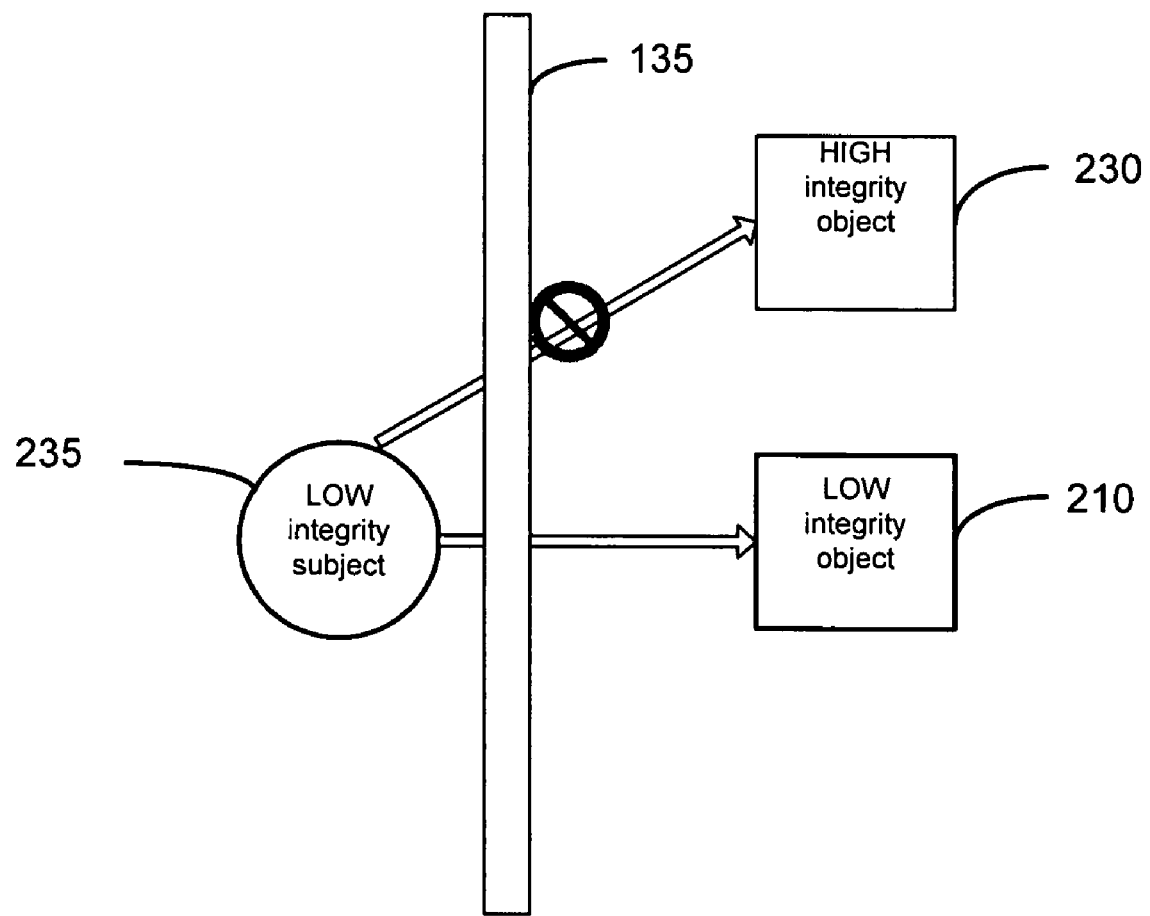
FIG. 2B is a block diagram of a demoted LOW subject that is unable to access a HIGH integrity object in accordance with one embodiment of the invention.

FIGS. 2A-2B are block diagrams that illustrate the process in which a HIGH integrity subject 220 is demoted. Referring to FIG. 2A, the HIGH integrity subject 220 attempts to read the HIGH integrity object 230. This generates a system call that prompts the mediator 135 to act.

The mediator 135, disposed between the high integrity object 220 and objects 210, 230, is a set of instructions that is configured to perform security operations such as reading the security attributes of an object and comparing those security attributes to another set of security attributes from a different object. A conflict is declared by mediator 135 when, for example, an object includes security attributes that limit the object to one section of the file system (i.e. merely logging into the operating system which is low sensitive files) and the other object includes security attributes that allow accessing of very sensitive data (e.g., financial files) in another section of the file system.

In this embodiment, the HIGH integrity subject 220 is allowed to read the HIGH integrity object 230 since the mediator 135 has not previously read attributes from another object that conflict with the HIGH integrity object 230. Thereafter, the HIGH integrity subject 220 attempts to read the LOW integrity object 210. A system call is again generated prompting the mediator 135 to read the security attributes of the LOW integrity object 210. The mediator 135 determines that a conflict exists between the HIGH and LOW integrity objects 230, 210. Since the LOW integrity object 210 has a conflict of interest with the HIGH integrity object 230, the HIGH integrity subject 220 is demoted to the same integrity level as the LOW integrity object 210, which is a LOW integrity subject level 235 shown in FIG. 2B. FIG. 2B further illustrates, in one embodiment, that a LOW integrity subject 235 is unable to access a HIGH integrity object 230 after the demotion process shown in FIG. 2A.

Figure 3:
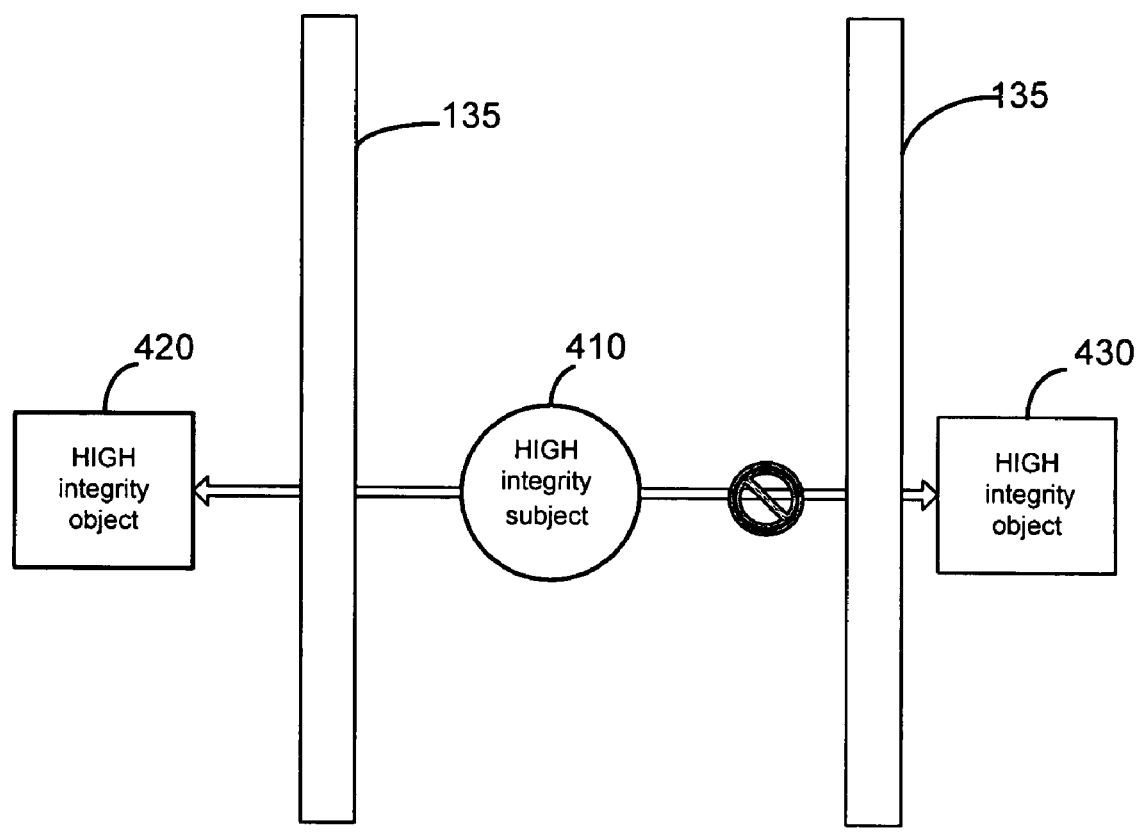
FIG. 3 is a block diagram of a HIGH integrity subject attempting to read a HIGH integrity object after reading another HIGH integrity object in accordance with one embodiment of the invention.

FIG. 3 is a block diagram that illustrates a HIGH integrity subject 410 that reads a HIGH integrity object 420 but is unable to read a HIGH integrity object 430 due to a conflict of interest existing between the objects. Specifically, in this embodiment, the HIGH integrity subject 410 first attempts to read the HIGH integrity object 420. A system call prompts the mediator 135 to then read the security attributes associated with the HIGH integrity object 420. The HIGH integrity subject 410 then attempts to read the HIGH integrity object 430. This prompts another system call to the mediator 135. The mediator 135 then compares the attributes of the two objects. The mediator 135 determines that these two objects have a conflict of interest with each other. Since a conflict of interest exists between the HIGH integrity objects 420 and 430, access is denied to the HIGH integrity subject 410 to read the HIGH integrity object 430 even though no demotion was involved with respect to the HIGH integrity subject 410.

Figure 4:
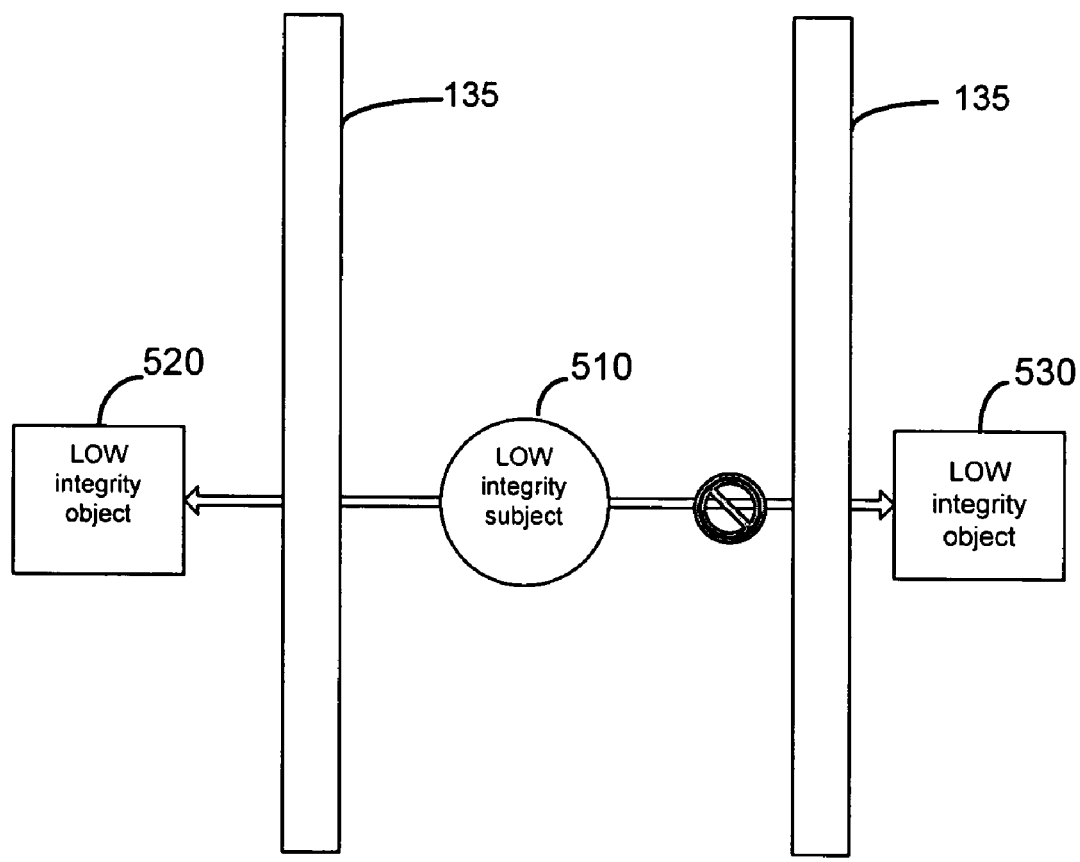
FIG. 4 illustrates a block diagram of a LOW integrity subject attempting to read a LOW integrity object after reading another LOW integrity object in accordance with one embodiment of the invention.

FIG. 4 illustrates a block diagram of a LOW integrity subject 510 first attempting to read the LOW integrity object 520. This triggers a system call that prompts the mediator 135 to act. The mediator 135 reads the security attributes related to the LOW integrity subject 520. The LOW integrity subject 510 then attempts to read the LOW integrity object 530. This generates another system call that prompts the mediator 135 to act. The mediator 135 then reads the attributes associated with the LOW integrity object 530. The mediator 135 determines that a conflict of interest exists between the two objects. Thereafter, the LOW integrity subject 510 is denied access to the LOW integrity object 530. This is due to conflict of interest between the LOW integrity object 520 and the LOW integrity object 530 with each other.

Figure 5A:
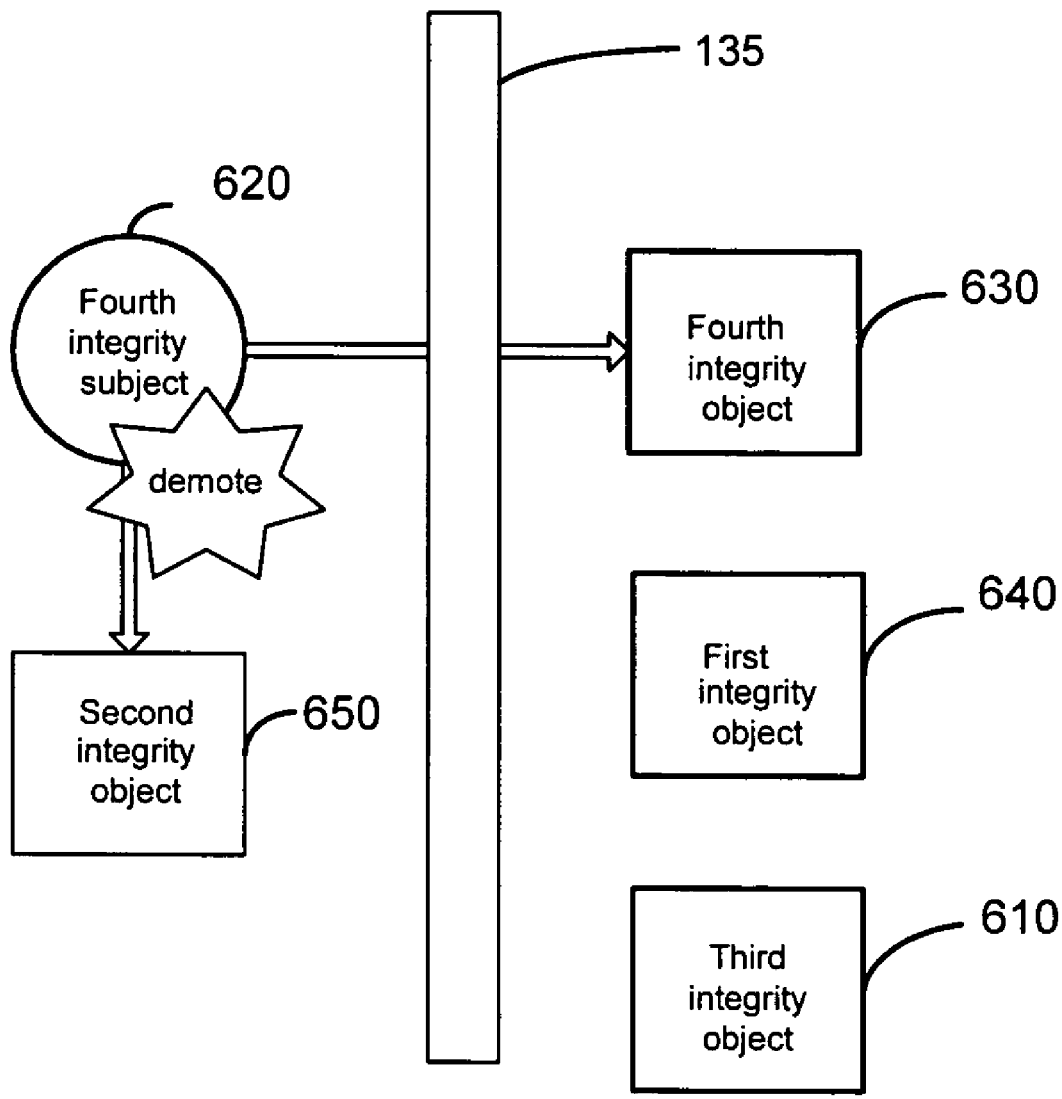
FIG. 5A illustrates a fourth integrity subject that reads a fourth integrity object and then attempts to read a third integrity object that is in conflict with the fourth integrity object in accordance with one embodiment of the invention.

FIGS. 5A-5D illustrate the implementation of security rules in which both the subjects and the objects possess multiple integrity levels. FIG. 5A is a block diagram of a plurality of integrity levels associated with a fourth integrity subject 620 and a first, second, third, and fourth integrity objects 640, 650, 610, 630 in accordance with one embodiment of the invention. In this embodiment, a fourth integrity subject 620 reads for a first time a fourth integrity object 630. The fourth integrity subject 620 then attempts to read a second integrity object 650 that is determined by mediator 135 to have a conflict of interest with the fourth integrity object 630. In this embodiment, the fourth integrity subject 620 is then demoted to a second integrity subject.

Figure 5B:
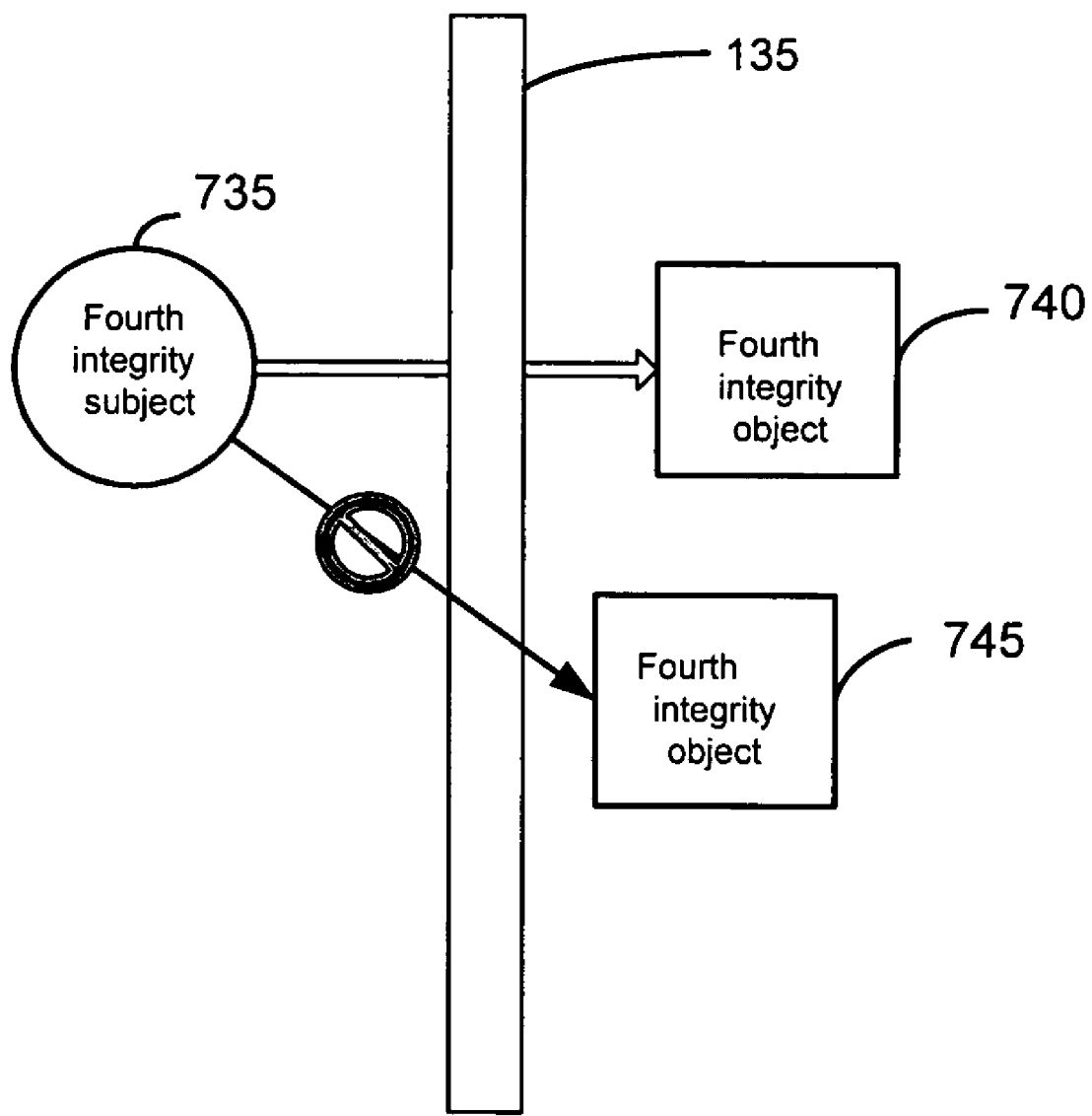
FIG. 5B illustrates a fourth integrity subject that reads a fourth integrity object and then attempts to read another a fourth integrity object in which a conflict exists in accordance with one embodiment of the invention.

FIG. 5B is a block diagram of a plurality of integrity levels associated with subjects and objects in accordance with one embodiment of the invention. In this embodiment, a fourth integrity subject 735 reads for a first time a fourth integrity object 740. The fourth integrity subject 735 then attempts to read another fourth integrity object 745 that has a conflict of interest with the previous fourth integrity object 740. In this embodiment, the fourth integrity subject 735 is denied access to the latter fourth integrity object 745.

Figure 5C:
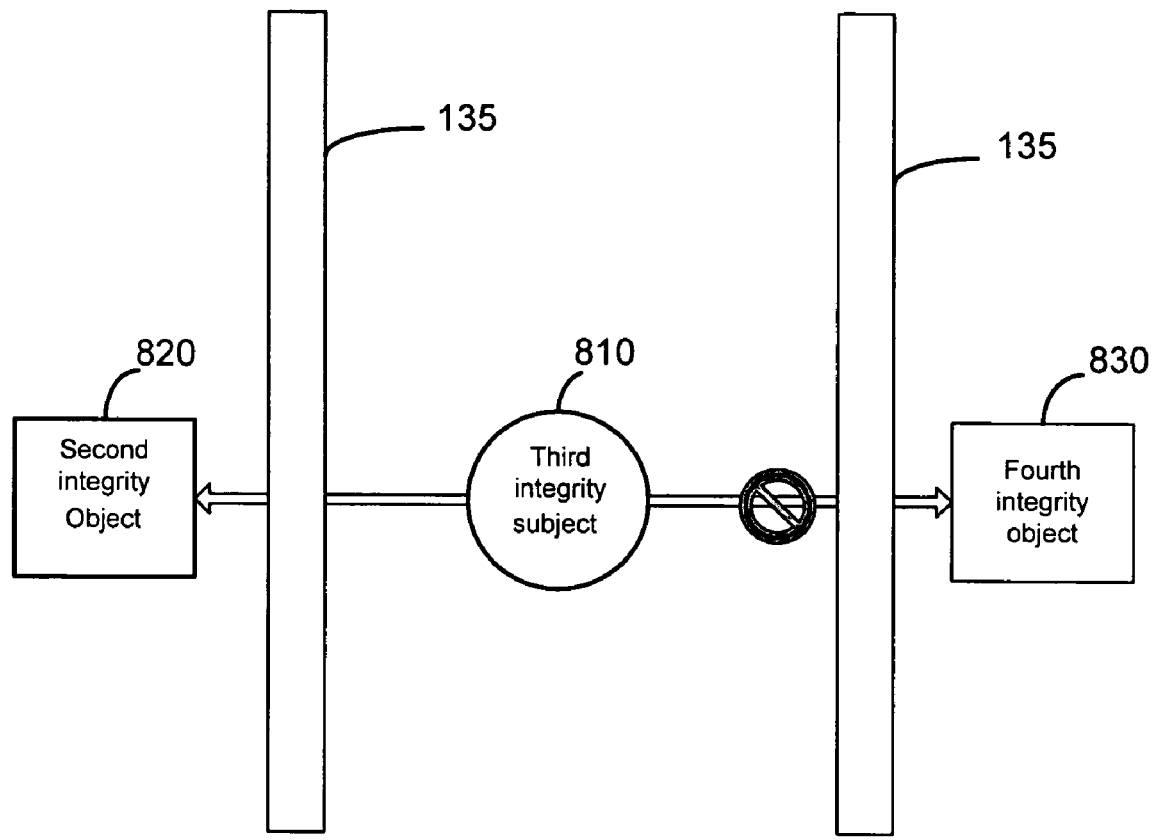
FIG. 5C illustrates a third integrity subject that reads a second integrity object and then attempts to read a fourth integrity object that is in conflict with the second integrity object in accordance with one embodiment of the invention.

FIG. 5C is a block diagram of a plurality of integrity levels associated with subjects and objects in accordance with one embodiment of the invention. Here, a third integrity subject 810 first reads a second integrity object 820. The third integrity subject 810 then attempts to read a fourth integrity object 830 that has a conflict of interest with the third integrity object 810. The third integrity subject 810 is denied access to the fourth integrity object 830.

Figure 5D:
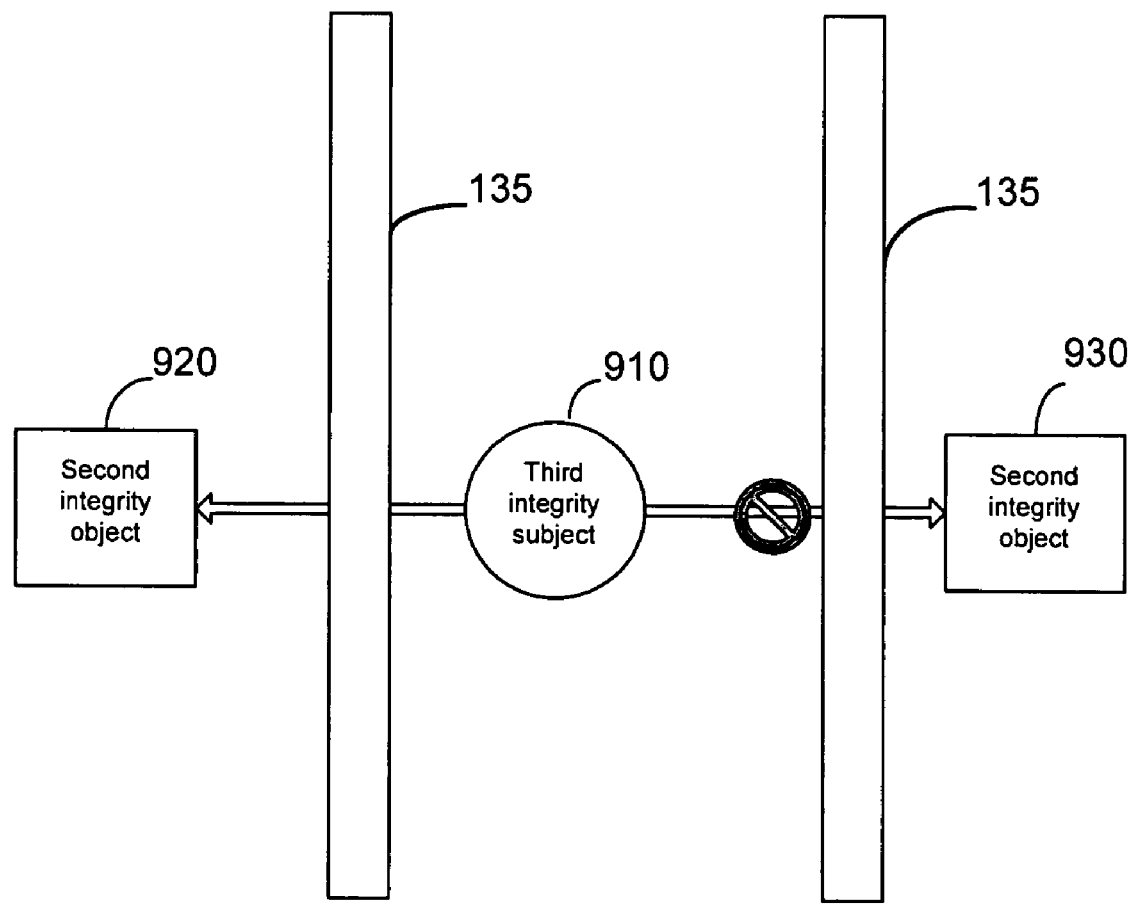
FIG. 5D illustrates a third integrity subject that reads a second integrity object and then attempts to read another second integrity object that are in conflict in accordance with one embodiment of the invention.

FIG. 5D is a block diagram of a plurality of integrity levels associated with subjects and objects in accordance with one embodiment of the invention. In this embodiment, a third integrity subject 910 first reads a second integrity object 920. The third integrity subject 910 then attempts to read another second integrity object 930 that has a conflict of interest with the second integrity object 920. The third integrity subject 910 is denied access to the second integrity object 930.

Figure 6:
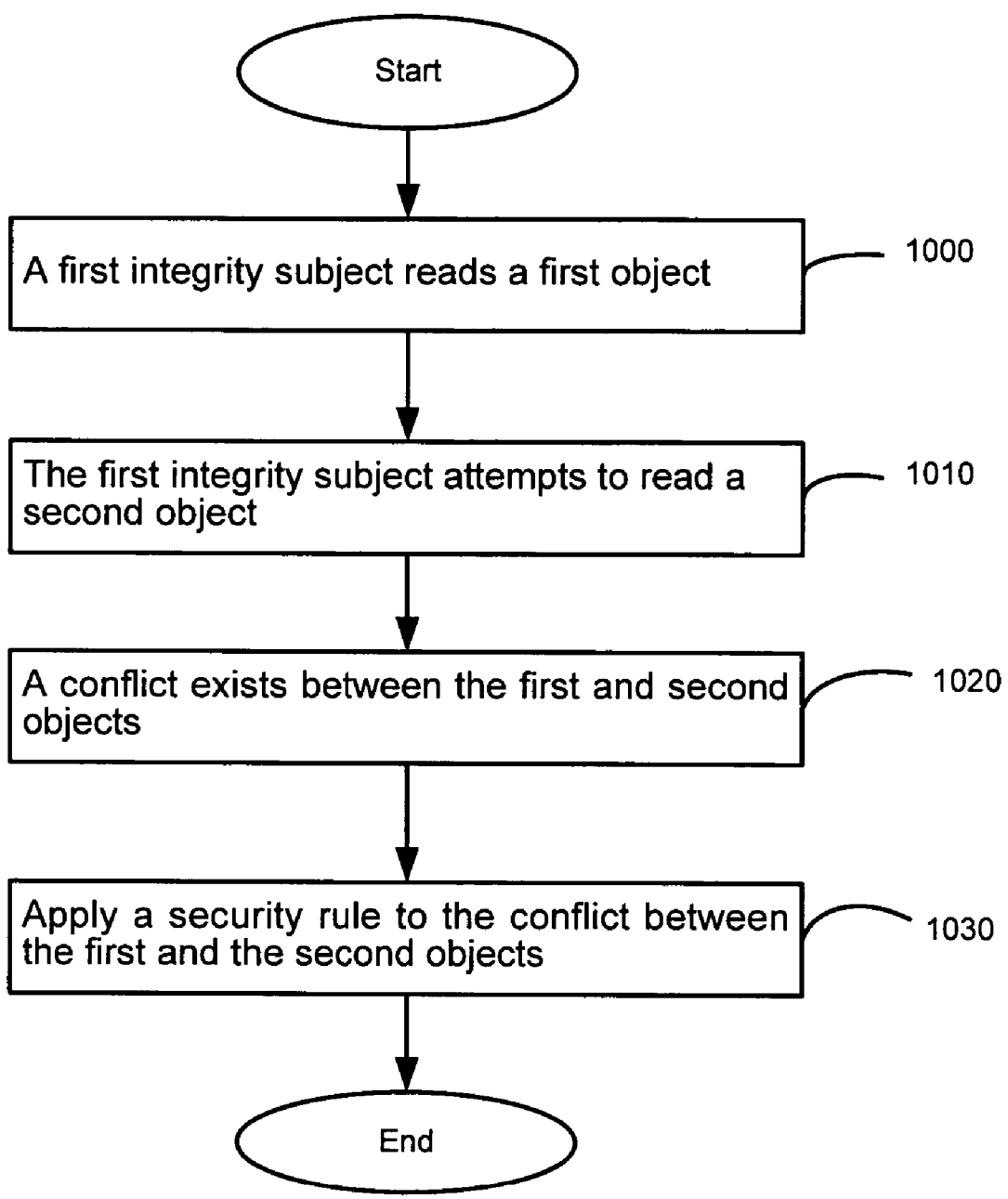
FIG. 6 is a flow diagram of a method of implementing a security system for an operating system in accordance with one embodiment of the invention.

FIG. 6 is a flow diagram of one method of implementing a security system for an operating system in accordance with one embodiment of the invention. A first integrity subject reads a first object at operation 1000. The first integrity subject attempts to read a second object at operation 1010. It is determined that a conflict exists between the first and second objects at operation 1020. At least one security rule is applied to the conflict between the first and the second objects at operation 1030. One security rule relates to demoting the first integrity subject to a second integrity subject based upon the conflict between the first and the second objects. In this embodiment, the first integrity subject and the first integrity object are considered to have a higher level of trust than the second integrity subject and the second integrity object. Another security rule relates to denying the first integrity subject access to the second object based upon the conflict between the first and the second objects. This security rule is typically implemented when the two objects that are read possess similar integrity levels. A trusted process for computer instructions that access the operating system is eliminated at operation 1040.

It will be appreciated that more or fewer processes may be incorporated into the method illustrated in FIG. 6 without departing from the scope of the invention and that no particular order is implied by the arrangement of blocks shown and described herein. Skilled artisans will appreciate that the method described in conjunction with FIG. 6 may be embodied in machine-executable instructions (e.g., software). The instructions can be used to cause a general-purpose or special-purpose processor that is programmed with the instructions to perform the operations described. Alternatively, the operations may be performed by specific hardware components that contain hard-wired logic for performing the operations, or by any combination of programmed computer components and custom hardware components. The methods may be provided as a computer program product that may include a machine-readable medium having stored thereon instructions which may be used to program a computer (or other electronic devices) to perform the methods. For the purposes of this specification, the terms "machine-readable medium" includes any medium that is capable of storing or encoding a sequence of instructions for execution by the machine and that cause the machine to perform any one of the methodologies of the present invention. The term "machine-readable medium" includes, but is not be limited to, solid-state memories, optical and magnetic disks, and carrier wave signals. Furthermore, it is common in the art to speak of software, in one form or another (e.g., program, procedure, process, application, module, logic, etc.), as taking an action or causing a result. Such expressions are merely a shorthand way of saying that the execution of the software by a computer causes the processor of the computer to perform an action or a produce a result.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A mandatory access control method for securing an operating system comprising:
providing a first integrity subject having a high integrity level, wherein the first integrity subject is a set of computer instructions residing in an operating system, wherein the operating system employs a low watermark access control mechanism;
reading a first object having a high integrity level through the first integrity subject;
attempting to read a second object through the first integrity subject, the second object having an integrity level that is lower than the high integrity level;
determining whether a conflict exists between the first object and the second object, such that a conflict exists when the second object may corrupt the first object;
retaining the high integrity level of the first integrity subject when there is no conflict between the first object and the second object; and
demoting the integrity level of the first integrity subject to a lower integrity level when a conflict exists between the first object and the second object.

2. The method of claim 1, wherein the first object is associated with highly sensitive data.

3. The method of claim 2 wherein the second object is associated with low sensitive data.

4. The method of claim 1 wherein the first object and the second object are at least one of a data file or a file directory residing in the operating system.

5. A mandatory access control method for securing an operating system comprising:
providing a subject having a high integrity level, wherein the subject is a set of computer instructions residing in an operating system, wherein the operating system employs a low water-mark access control mechanism;

reading a first object through the subject;

attempting to read a second object, the second object having a lower integrity level than the first object;

determining that a conflict exists between the first and the second objects, such that a conflict exists when the second object may corrupt the first object; and denying access of the second object to the subject when a conflict exists between the first and second objects.

6. A mandatory access control method for securing an operating system comprising:

providing a subject having a low integrity level, wherein the subject is a set of computer instructions residing in an operating system, wherein the operating system employs a low water-mark access control mechanism;

reading a LOW integrity object having a low integrity level through the subject;

attempting to read a HIGH integrity object having an integrity level higher than the LOW integrity object;

determining that a conflict exists between the LOW and the HIGH integrity objects, such that a conflict exists when the HIGH integrity object may corrupt the LOW integrity object; and denying access of the HIGH object to the subject when a conflict exists between the HIGH integrity object and the LOW integrity object.

7. A mandatory access control method for securing an operating system comprising:

providing a subject having a low integrity level, wherein the subject is a set of computer instructions residing in an operating system, wherein the operating system employs a low water-mark access control mechanism;

reading a first LOW integrity object having a low integrity level through the subject;

attempting to read a second LOW integrity object having a low integrity level;

determining that a conflict exists between the first and second LOW integrity objects, such that a conflict exists when the second LOW integrity object may corrupt the first LOW integrity object; and denying access of the second LOW object to the subject when a conflict exists between the first and second LOW integrity objects.

8. A mandatory access control method for securing an operating system comprising:

providing a first integrity subject having a higher integrity level, wherein the first integrity subject is a set of computer instructions residing in an operating system, wherein the operating system employs a low water-mark access control mechanism;

reading a first object having a high integrity level through the first integrity subject;

attempting to write to a second object through the first integrity subject, the second object having an integrity level that is lower than the integrity level of the first object;

determining that a conflict exists between the first and second objects, such that a conflict exists when the second object may corrupt the first object;

retaining the high integrity level of the first integrity subject when there is no conflict between the first object and the second object; and demoting the integrity level of the first integrity subject to a lower integrity level when a conflict exists between the first object and the second object.

9. The method of claim 8, wherein the first object is associated with highly sensitive data.

10. The method of claim 9 wherein the second object is associated with low sensitive data.

11. The mandatory access control method of claim 5 wherein the first object and the second object are at least one of a data file or a file directory residing in the operating system.

12. The mandatory access control method of claim 6 wherein the LOW integrity object and the HIGH integrity object are at least one of a data file or a file directory residing in the operating system.

13. The mandatory access control method of claim 8 wherein the first object and the second object are at least one of a data file or a file directory residing in the operating system.

* * * * *